United States Patent [19]
Du

[11] Patent Number: 5,537,399
[45] Date of Patent: Jul. 16, 1996

[54] LOCAL NETWORK

[75] Inventor: Yonggang Du, Aachen, Germany

[73] Assignee: U.S. Philips Corporation, New York, N.Y.

[21] Appl. No.: 360,904

[22] Filed: Dec. 21, 1994

[30] Foreign Application Priority Data

Dec. 22, 1993 [DE] Germany ............................ 43 43 839.3

[51] Int. Cl.$^6$ ...................................................... H04B 7/212
[52] U.S. Cl. ........................ 370/58.2; 370/60.1; 370/79; 370/94.2; 370/95.3; 455/33.1; 455/54.2; 379/59; 379/63
[58] Field of Search ............................ 370/50, 53, 58.2, 370/58.3, 60, 60.1, 79, 85.1, 85.2, 85.6, 85.7, 94.1, 94.2, 95.1, 95.3; 455/33.1, 33.2, 49.1, 53.1, 54.1, 54.2, 55.1; 329/58, 59, 60, 63; 340/825.5, 825.51

[56] References Cited

U.S. PATENT DOCUMENTS

| | | | |
|---|---|---|---|
| 4,870,408 | 9/1989 | Zdunek et al. | 370/95.1 X |
| 5,307,348 | 4/1994 | Buchholz et al. | 370/85.2 |
| 5,363,369 | 11/1994 | Hemmady et al. | 370/60 |
| 5,390,299 | 2/1995 | Rege et al. | 370/60 X |
| 5,420,863 | 5/1995 | Taketsugu et al. | 370/95.3 |

FOREIGN PATENT DOCUMENTS

| | | |
|---|---|---|
| 0544457 | 2/1993 | European Pat. Off. . |
| 4329048 | 2/1995 | Germany . |

OTHER PUBLICATIONS

"A Versatile ATM Switch Concept" by U. Killat, W. Kowalk, J. Noll, H. G. Keller, H. J. Reumermann and U. Ziegler, XIII International Switching Symposium, Stockholm, Sweden, 27th May to 1st Jun. 1990, Section A6, paper No. 4, Proceedings vol. IV, pp. 127 to 134.

"Ohne Chips Nichts Los—Standard–Chips fur ATM–Systeme sind im Kommen" by B. Reder, Elektronik Jan. 1993, pp. 66–75.

Primary Examiner—Douglas W. Olms
Assistant Examiner—Russell W. Blum
Attorney, Agent, or Firm—Michael J. Balconi-Lamica; David Schreiber

[57] ABSTRACT

A local area network comprises a plurality of network interfaces with each network interface coupled to a station, the network interfaces further for exchanging data with each other. The local area network further comprises a distribution station for exchanging data with the network interfaces. The distribution station further receives load information of the network interfaces, and in response to the load information, transmits a channel distribution for the exchange of data between the network interfaces.

14 Claims, 3 Drawing Sheets

LOCAL NETWORK

BACKGROUND OF THE INVENTION

The invention relates to a local network comprising a plurality of network interfaces which are coupled each to a station and are provided for exchanging data with each other.

A local network is known from the publication "Ohne Chips nichts los"—Standard-Chips für ATM-Systeme sind im Kommen, by Bernd Reder, Elektronik 1/1993, pages 66 to 75. This paper discusses the current situation of the development of integrated circuits used in local networks, which networks operate in the asynchronous transfer mode (ATM). Each station is then connected to the ring lines of the local network via a network interface. Switching devices (switches) are used in the network interfaces to control the ATM cell stream.

When an asynchronous transfer mode is used in a system, payload, for example, telephone, video or sound signals, is sent in blocks of fixed lengths through arrangements for digital signal processing. By a block of fixed length is meant a cell which contains a given number of bytes (for example, 53 bytes). Each cell contains a header field having a length of, for example, 5 bytes, and an information field which accommodates the payload and has a length of, for example, 48 bytes. In such a header field are available routing identification codes, error recognition data and control data. Routing identification codes are meant to be understood as trunk identifiers and connection identifiers. The connection identifier, also referenced VCI (Virtual Channel Identifier), contains the description of the destination of the cell in the system. To transmit a cell, a virtual channel is made available in response to the virtual channel identifier. As a rule, a VCI is changed each time a switching point is reached. A trunk group of various virtual channels is referenced a virtual path. A virtual path is identified by the trunk identifier. Such a virtual path is called a virtual path identifier (VPI). Cells are assigned to consecutively determined periods of time. The length of such a period of time depends on the clock rate used as a basis of the transfer components. If no payload is available, empty cells i.e. cells without payload, are transmitted in such a period of time. Cells containing payload are referenced payload cells.

For transmitting or exchanging data between the network interfaces of the local network, a cable-bound or a wireless type of radio communication can be selected. Data transmission via radio channels is advantageous, for example, if the station is to be mobile. Such a station is meant to be understood, for example, as a cordless telephone, a portable personal computer or wireless headphones.

SUMMARY OF THE INVENTION

It is an object of the invention to provide a flexible local network.

This object is achieved by a local network having the following characteristic features:
the local network comprises a plurality of network interfaces which are coupled each to a station and are provided for exchanging data with each other, and a distribution means provided for
exchanging data with the network interfaces,
receiving load information of the network interfaces, and
transmitting, in response to the load information, the channel distribution for the exchange of data between the network interfaces.

In the local network according to the invention the transmission between the individual network interfaces may take place, for example, by means of data packets. It is also possible to transmit signals of a hierarchical system. Each network interface periodically informs the distribution means, which is, for example, a radio station, of the amount of information to be transmitted (load information). This may be followed by a message that a signal having a bit rate of 2 Mbit/s is needed for transmitting the data. In the case of packet switching, for example the number and size of the packets are stated. In the radio station there is then determined what channel capacity is to be rendered available. For example, between two network interfaces it is thus possible to assign one or various channels having an overall capacity of 34 Mbit/s, and between other network interfaces one or various 2 Mbit/s channels. For this purpose, a frequency-division or a time-division multiplex method can be used. It is also possible to use the CDMA (Code Division Multiple Access) method.

The transmission between the individual network interfaces and the radio station may either be effected via a separate carrier frequency or by transmitting in a time slot when the time-division multiplex method is implemented.

The data exchange between the network interfaces may be effected by wire communication paths or radio communication paths. The flexibility is enhanced if data are transmitted by radio communication paths.

A wireless local network is suitable especially in private households for coupling telephone, television screen, loudspeaker, audio tuner, television tuner, CD player, personal computer and other apparatus. It is also possible then to alter the arrangement in a simple manner (flexibility).

If packets are transmitted between the individual network interfaces in the local network, a network interface has an output buffer means for buffering the packets to be transmitted. The radio station then receives load information about the contents of each output buffer means from the network interfaces.

A special case of packetized transmission is the asynchronous transfer mode (ATM), in which packets or blocks or fixed length are transmitted as cells. Due to the fixed length of the cells this results in a simpler signal processing. A network interface transmits and receives cells and transmits load information about the number of cells to be transmitted to another network interface. Because of the small amount of information, this load information is generally not transmitted in cells in the asynchronous transfer mode.

The load distribution can be simply controlled by the radio station if the radio channels are time slots of a time-division multiplex frame. In that case the radio station is provided for assigning time slots of a time-division multiplex frame to each network interface in dependence on the number of cells dwelling in the assigned output buffer means and to be transmitted to another network interface. For example, the radio station assigns three time slots to a network interface that has a large load and one time slot to another network interface that has a smaller load. Various cells can be transmitted in one time slot.

Detecting the cells present in the output buffer means and transmitting cells during an assigned time slot is effected as follows. A network interface comprises a controller for controlling the output buffer means and for determining the number of cells in the output buffer means, a radio transmitter for transmitting the load information available at the controller to the radio station, and a radio receiver for conveying the data received from the radio station to the controller. The controller is provided for producing a enable command for the radio transmitter, so that only during an assigned time slot the radio transmitter is used for transmitting cells delivered by the output buffer means.

Inside a network interface the cell stream is guided by a switching device. This switching device is provided for routing the cells received by the radio receiver, cells supplied to an assigned station, or cells supplied to the controller, to the assigned station, to the controller and/or to the radio transmitter.

An embodiment for the switching device is characterized by the following features: The switching device is coupled via auxiliary lines to an output of the station, an output of the controller and of the radio receiver and via trunk lines to an input of the station, an input of the controller and of the radio transmitter. Each trunk line is coupled to a transmission buffer of the output buffer means. Each transmission buffer is coupled via its cell filter to an auxiliary line. A cell filter is arranged for verifying the address of a cell and for conveying cells carrying a correct address to the assigned transmission buffer. A switch controller is arranged for exchanging messages about the cells conveyed to a transmission buffer with a cell filter and is arranged at least for enabling the transmission buffer.

The radio station assigns certain time channels to each interface. For example, three time slots may be assigned to one network interface and one time slot per time-division multiplex frame may be assigned to another network interface which has fewer cells in the output buffer means. A base controller in the radio station computes from the received load information the number of time slots for each time-division multiplex frame for a network interface. The base controller is then provided for receiving the number $Z_k$ of cells buffered in an output buffer means of a network interface and which cells are to be applied to another network interface, computing the number $S_k$ of time slots of a time-division multiplex frame for a network interface with the formulas $$S_k = INT(A_k M)$$

$$A_k = \begin{cases} \dfrac{Z_k}{\sum_{i=1}^{n} Z_i} & \text{if } k = 1 \\ \left(1 - \sum_{i=1}^{k-1} B_i\right) \dfrac{Z_k}{\sum_{i=k}^{n} Z_i} & \text{otherwise} \end{cases}$$

$$B_i = \dfrac{S_i}{M},$$

where INT denotes a rounding operation, M the number of time slots of a time-division multiplex frame, n the number of network interfaces, k=1, 2 . . . , n and i=1, 2, . . . n−1, and distributing the time slots for each network interface.

First the base controller computes for a first network interface a part $A_1$. This part $A_1$ is multiplied by the number M of time slots of a time-division multiplex frame. The result of the multiplication rounded up or rounded down (by the operation INT) denotes the number $S_1$ of time slots of the time-division multiplex frame for the first network interface. Then a corrected part $B_1$ is computed. The number of time slots for the other network interfaces are computed in accordance with said formulas in the same manner.

The distribution of the time slots in the time-division multiplex frame is random. For example, the time slots for a network interface may be distributed successively or substantially uniformly in the time-division multiplex frame.

In a further embodiment of the invention the radio station is provided to be used as a bridging element for conveying the data coming from a network interface to another network interface. Similar transmission methods and circuits to those used in the GSM system (Global System for Mobile Communication) may then be used. A survey of that mobile radio system is found in EP-A2-0 544 457.

The invention relates to a network interface and a radio station for a local network. This network interface is coupled to a station, is used for exchanging data with adjacent network interfaces and a radio station via radio transmission paths and for transmitting load information to the radio station and for receiving from the radio station an information signal about at least a radio channel to be used for the exchange of data with the adjacent network interfaces. The radio station for a local network which comprises a plurality of network interfaces coupled each to one station for exchanging data via radio transmission paths is used for exchanging data with the network interfaces via radio transmission paths, for receiving load information from the network interfaces and, in response to the load information, for transmitting the radio channel distribution for the exchange of data between the network interfaces.

BRIEF DESCRIPTION OF THE DRAWINGS

Embodiments of the invention will be further explained hereafter with reference to the drawing Figures, in which.

DETAILED DESCRIPTION OF THE PREFERRED EMBODIMENTS

Figure 1:
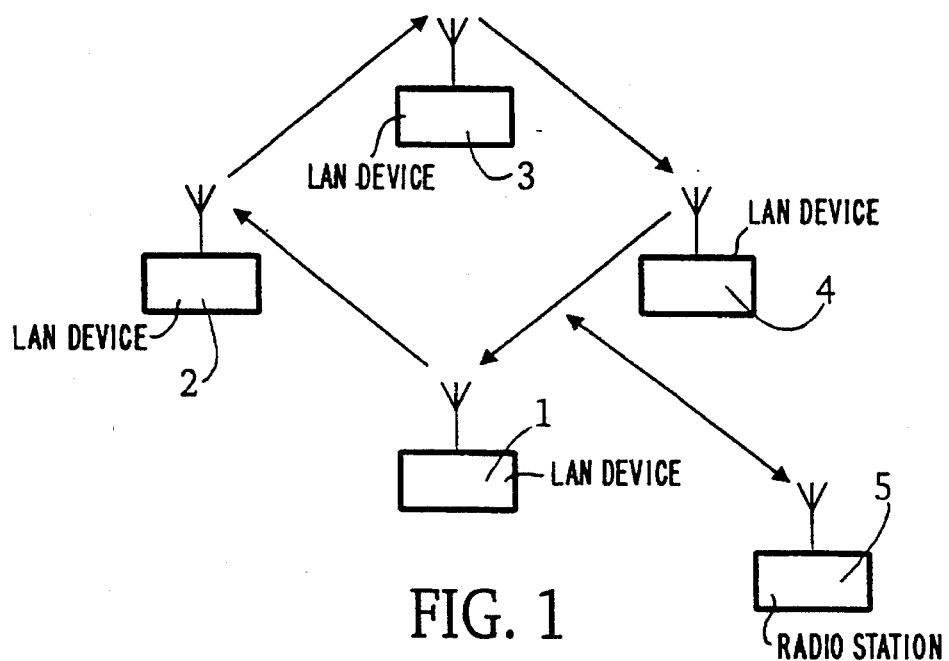
FIG. 1 shows a general view of a local network operating in the asynchronous transfer mode, in which data are exchanged by radio transmission paths.

FIG. 1 shows a general view of an embodiment for a local network comprising four devices 1 to 4 which comprise each a network interface and a station. A station may be, for example, a telephone, a videophone, a personal computer, a television set or an audio tuner. The messages i.e. information signals coming from the stations or from the network interfaces of devices 1 to 4 are transmitted in the asynchronous transfer mode in cells via radio transmission paths between the individual network interfaces. The network interface of device 1 transmits the cells to the network interface of device 2, the network interface of device 2 transmits the cells to the network interface of device 3, the network interface of device 3 transmits the cells to the network interface of device 4 and the network interface of device 4 transmits the cells to the network interface of device 1 (ring traffic).

A cell contains a header field of, for example, 5 bytes and an information field of, for example, 48 bytes. The information in the header field of the cell is specifically used for addressing and for carrying out switching functions.

The radio transmission of the cells between the individual network interfaces is carried out according to a time-division multiplex method. For each ring connection there are one or more time slots of a time-division multiplex frame available. A plurality of cells can be inserted into one time slot. A radio station 5 which also communicates via transmission paths with the network interfaces of the devices 1 to 4 controls the distribution of the time slots. Because there is less information to be exchanged than with data exchange via the ring lines, no cells are used. The ring traffic is handled by a first carrier having a first carrier frequency and the traffic between the network interfaces and the radio station 5 by a second carrier having a second carrier frequency. Alternatively, it is possible that a further time slot is rendered available for the traffic between the radio station 5 and the network interfaces.

Figure 2:
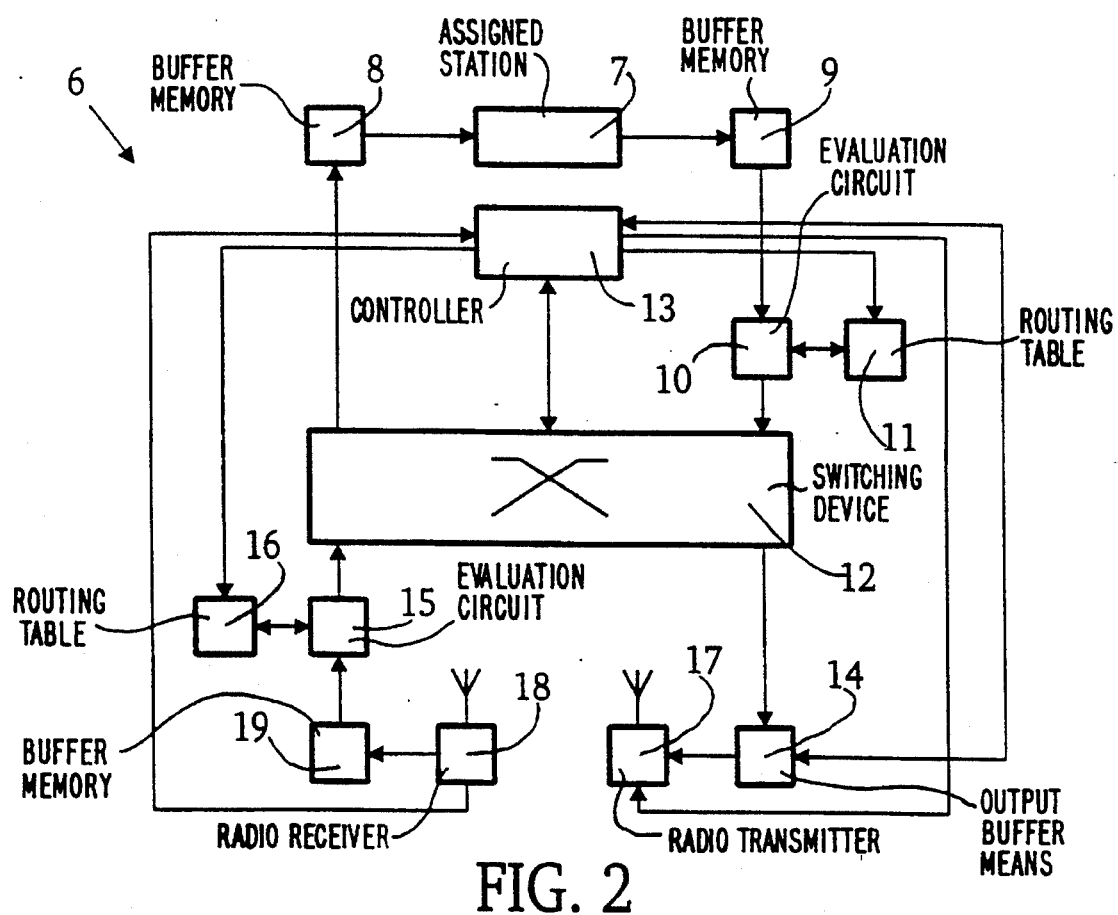
FIG. 2 shows in block diagrammatic form a network interface with assigned station used in the local network.

A network interface 6 and an assigned station 7 are shown in detail in FIG. 2. Station 7 is connected to buffer memories 8 and 9 of the network interface 6. Buffer memory 9 conveys cells from the station 7 to a first evaluation circuit 10 which is coupled to a routing Table 11 and which evaluates the header field of an incoming cell. Address information in the header field of the cell is used as memory addresses for the routing Table 11 connected to the first evaluation circuit 10. The information stored at the memory address in the routing Table 11 is used by the first evaluation circuit 10 for further processing and conveying the cell. For example, the first evaluation circuit 10 can copy the cell and give it a new address.

The first evaluation circuit 10 is connected to a switching device 12 which leads the cell stream to the network interface 6. The switching device 12 is further coupled to the buffer memory 8, a controller 13, an output buffer means 14 and a second evaluation circuit 15. Cells and control information are transmitted via connections between the controller 13 and the switching device 12. The controller 13 which may be arranged as a microprocessor is used for setting up or clearing a connection and for controlling the switching device 12.

The switching device 12 receives cells from the second evaluation circuit 15 which functions in the same way as the first evaluation circuit 10 and which is connected to a further routing Table 16. The controller 13 can also supply new memory contents to the routing Tables 11 and 16 via separate connections.

The buffer memory 8 and the output buffer means 14 receive each cells from the switching device 12 and are used, as is buffer memory 9, for clock matching. The output buffer means 14, which additionally announces the number of buffered cells as load information to the controller 13 via a connection, conveys received cells to a radio transmitter 17 which inserts cells into predefined time slots of a time-division multiplex frame. Such a transmitter thereto modulates the transmit data on a first carrier as this is done, for example, in the GSM system. The controller 13 controls radio transmitter 17 in such a way that a first carrier containing the cells is transmitted only during a time slot intended for transmitting cells of the network interface 6. The radio transmitter 17 receives control information for the load information from the controller 13 via a further line. The load information is modulated on a second carrier.

A radio receiver 18 receives data modulated on a first carrier and inserted in specific time slots from another network interface and control information modulated on a second carrier from the radio station 5. The radio receiver 18 has a similar structure to the radio receiver known from the GSM system. After they have been demodulated, the received cells are applied to the second evaluation circuit 15 via a further buffer memory 19 which is also used for clock matching. Load information is supplied to the controller 13 via another line.

Two types of payload cells are transmitted via the radio transmitter 17 and the radio receiver 18. On the one hand, user cells containing in their information field, for example, messages or data of the user of a connection that was set up previously and, on the other hand, control cells containing in their information field control information for the set up or clear-down of a connection. The switching device 12 can transfer a user cell received from the second evaluation circuit 15 to station 7 or to the output buffer means 14. A user cell may also be erased in the second evaluation circuit 15. The switching device 12 can also switch a user cell both to station 7 and, simultaneously, to the output buffer means 14. The switching device 12 conveys a user cell produced by the station 7 only to the output buffer means 14.

Control cells produced by the radio receiver 18 can be conveyed to the station 7 and/or to the output buffer means 14. A control cell can further be switched through to controller 13. Control cells produced by the controller 13 can reach station 7 and/or output buffer means 14. The control cells produced by the station 7 can also be returned to the station 7 by means of a self-test.

Upon reception of a cell, first the header field of the cell is evaluated in the switching device 12. If the address in the header field does not match the address of station 7, the address is transferred to the output buffer means 14. If the address in the header field of the cell does match the address of station 7, this address is sent to the station 7 and/or to the controller 13. It is furthermore conceivable for the cell to be additionally transferred to the output buffer means 14.

Certain bits in the header field of a cell are reserved for the Virtual Channel Identifier (VCI). This identifier contains the destination of a cell and indicates a virtual channel thereto according to normalization proposals. Certain bits in the header field of the cell are further reserved for the Virtual Path Identifier (VPI). The VPI contains information about the address i.e. the destination. The VCI may contain the user-related identification code for a connection, the type of connection and the type of cell.

According to current normalization regulations the header field of the cell contains 8 bits for the VPI and 16 bits for the VCI. A bit of the VCI can be used for indicating whether a control cell or a user cell is concerned. At least two further bits can indicate the type of connection. It may be a unicast connection, a multicast connection or a broadcast connection. In the case of a unicast connection or end-to-end connection, there is a virtual channel between a user of a first station and a user of a second station. In the case of a multicast connection or point-to-multipoint connection, various users of stations are connected to each other. In the case of a broadcast connection, a transmitting station transmits cells having the same contents of the information field to all the stations located between the transmitting station and the last receiving station. The remaining bits of the VCI may be used for a user-related identification code for a connection. The VCI and VPI defined in this way identify unique connections. How a connection is set up or cleared in such a local network is described, for example, in German Patent application P 43 29 048.

Figure 3:
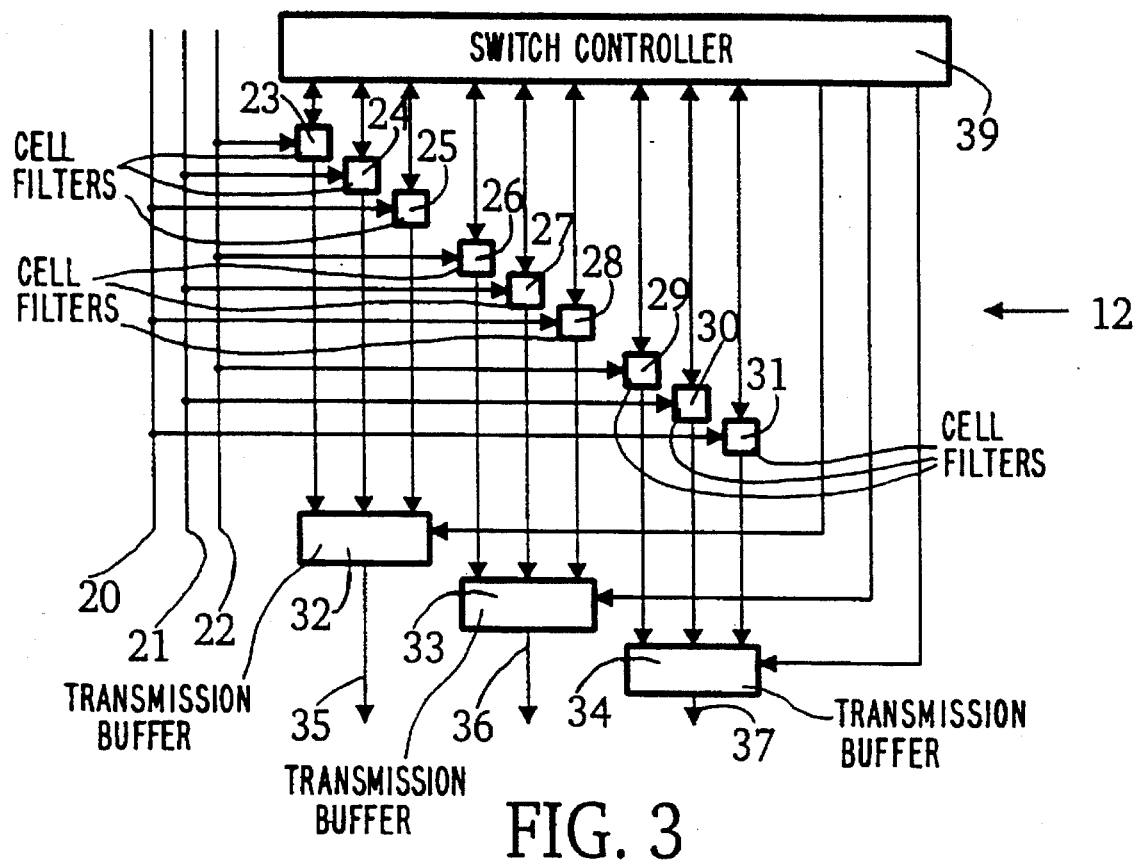
FIG. 3 shows a switching device used in a network interface.

A block diagrammatic form of an embodiment for a switching device 12 included in the network interface 6 is shown in FIG. 3. Such a switching device 12 is further described in the publication "A Versatile ATM Switch Concept" by U. Killat, W. Kowalk, J. Noll, H. G. Keller, H. J. Reumermann and U. Ziegler, XIII International Switching Symposium, Stockholm, Sweden, 27th May to 1st Jun. 1990, Session A6, paper #4, Proceedings Vol. IV, pages 127 to 134. The switching device 12 is connected to the first evaluation circuit 10 via an auxiliary line 20, to the second evaluation circuit 15 via an auxiliary line 21 and to the controller 13 via a third auxiliary line 22. To each of the auxiliary lines 20, 21 and 22 are connected three of the cell filters 23 to 31. The output of the cell filter 23 connected to the auxiliary line 22, the output of the cell filter 24 connected to the auxiliary line 21 and the output of the cell filter 25 connected to the auxiliary line 20 are coupled to a transmission buffer 32. The outputs of the cell filters 26 to 28 are coupled to a transmission buffer 33 and the outputs of the cell filters 29 to 31 to a transmission buffer 34. The cell filters 26 and 29 are connected to the auxiliary line 22, the cell filters 27 and 30 are connected to the auxiliary line 21 and the cell filters 28 and 31 are connected to the auxiliary line 20. The output of the transmission buffer 32 is coupled to the buffer memory 8 via a trunk line 35, the output of the transmission buffer 33 to the output buffer means 14 via a trunk line 36 and the output of the transmission buffer 34 is coupled to the controller 13 via a trunk line 37.

A cell filter 23 to 31 checks by the address in the header field of a cell whether the incoming cell is to reach the assigned trunk line 35 to 37. Before cells reach the assigned transmission buffer 32 to 34, they are also buffered in a cell filter 23 to 31. The buffering of the cells is announced to a switch controller 39 which determines the order in which all the cells buffered in a cell filter 23 to 31 are read out and which controller also controls the reading of the cells from the transmission buffers 32 to 34.

The controller 13 receives load information (number of cells) from the output buffer means 14. This load information is transferred from the controller 13 via the radio transmitter 17 to the radio station 5, which station 5 informs the controller 13 of the distribution of time slots after all the load information has been received from all the network interfaces. The controller 13 receives from the radio station 5 via the radio receiver 18 the information about the distribution of the time slots. Based upon this information the controller 13 forms a enable command for the radio transmitter 17 which, after receiving the enable command, reads cells from the output buffer means 14 and modulates them on a first carrier.

Figure 4:
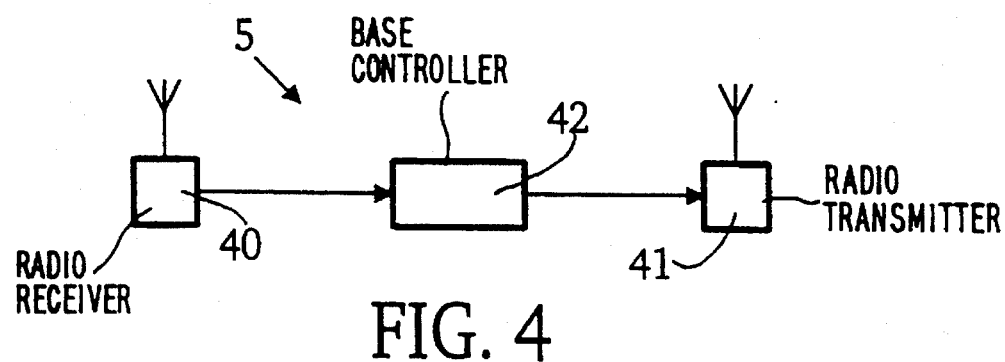
FIG. 4 shows in block diagrammatic form a radio station used in the local network.

A block diagrammatic form of radio station 5, which station comprises a radio receiver 40, a radio transmitter 41 and a base controller 42, is shown in FIG. 4. The base controller 42 computes the load distribution from the received load information of all the network interfaces.

The algorithm for distributing the time slots for n network interfaces will be described in the following.

Each network interface contains $Z_k$ cells in the output buffer means 14. Each multiplex frame has M time slots. First part A of the total number of time slots is computed for a first network interface, according to the following formula:

$$A_1 = \frac{Z_1}{\sum_{i=1}^{n} Z_i}$$

Then a rounded number S of time slots is computed for the first network interface $$S_1 = INT(A_1 M)$$

INT represents a rounding operation which rounds up or down a floating point notation. This rounding necessitates a correction of part B to compute the further time slots $A_k$, k=2, ..., n:

$$B_1 = \frac{S_1}{M}$$

The sum of all the further parts $A_k$, k=2, ..., n, is then 1−B. The part assigned to the second network interface is:

$$A_2 = (1 - B_1) \frac{Z_2}{\sum_{i=2}^{n} Z_i}$$

The rounded number $S_2$ of time slots for the second network interface is:

$$S_2 = INT(A_2 M)$$

From this again a corrected part $B_2$ is to be computed:

$$B_2 = \frac{S_2}{M}$$

In this manner the time slot pans are also computed for the other network interfaces. For a network interface k there are then the following formulas:

$$A_k = \left(1 - \sum_{i=1}^{k-1} B_i\right) \frac{Z_k}{\sum_{i=k}^{n} Z_i}$$

$$S_k = INT(A_k M)$$

$$B_k = \frac{S_k}{M}$$

The base controller 42 computes the distribution of the time slots for each new time-division multiplex frame.

Figure 5:
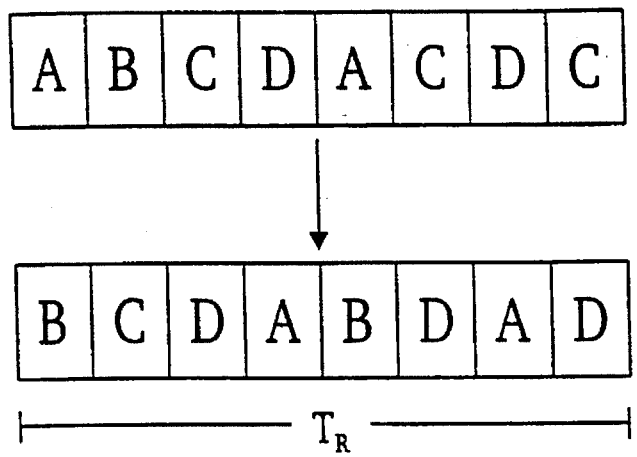
FIG. 5 shows in diagrammatic form a time-division multiplex frame in explanation of radio transmission of data between the network interfaces.

An example for the distribution of 8 time slots of a time-division multiplex frame $T_R$ is shown in FIG. 5. A network interface A transmits cells to a network interface B, network interface B transmits cells to a network interface C, network interface C transmits cells to a network interface D and network interface D transmits cells to the network interface A. In the output buffer means 14 of network interface A there are buffered four cells, in the output buffer means 14 of network interface B there are buffered two cells, in the output buffer means 14 of network interface C there are buffered eight cells and in the output buffer means 14 of network interface D there are buffered six cells. The base controller 42 assigns two time slots to network interface A, one time slot to network interface B, three time slots to network interface C, and two time slots to network interface D. The distribution of the time slots is effected uniformly over the time-division multiplex frame $T_R$ in this example.

Figure 6:
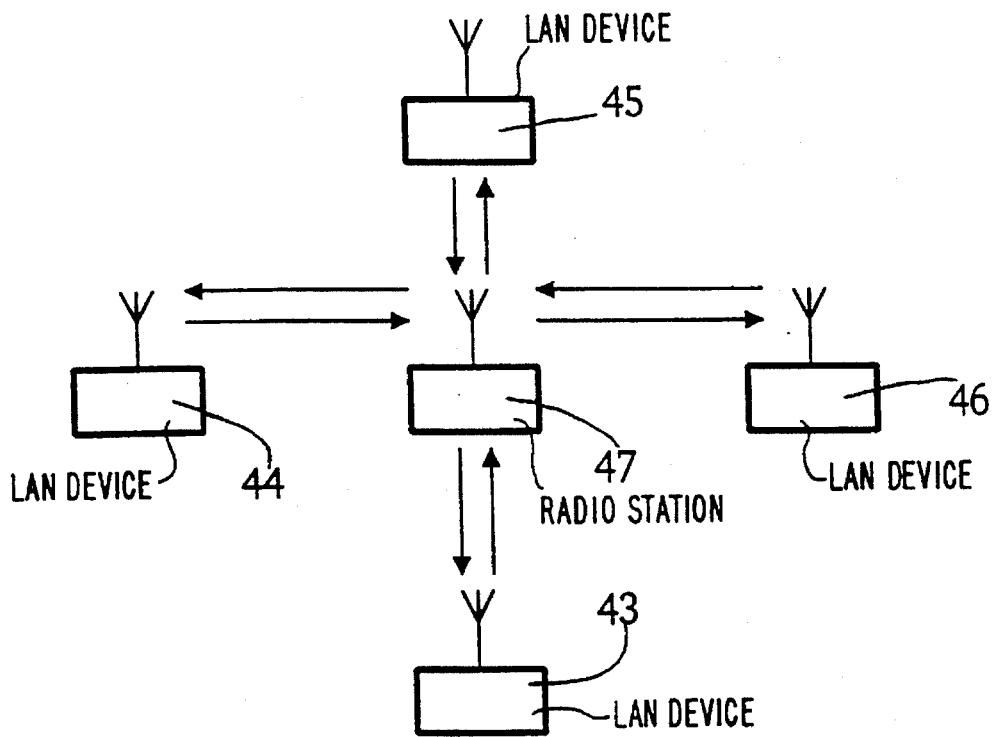
FIG. 6 shows a general view of a further embodiment for a local network.

FIG. 6 shows a further embodiment for a local network. It comprises four devices 43 to 46 which have a network interface and an assigned station. A radio station 47 is here not only used for computing the time slot distribution, but also as a bridging element. Cells are then not transmitted directly from one network interface to the other, but via the radio station 47. Such an embodiment may utilize many components of a GSM system.

What is claimed is:

1. A local network comprising:

a plurality of network interfaces coupled each to a station, said network interfaces for mutually exchanging data; and a distribution means, wherein said distribution means comprises means for exchanging data with said network interfaces, means for receiving load information of said network interfaces, wherein the load information comprises an amount of information to be transmitted in a data exchange between said network interfaces, and means for transmitting, in response to the load information, a channel distribution for the exchange of data between said network interfaces, wherein the channel distribution is determined from the received load information of all said network interfaces and further comprises a channel allocation and a channel capacity for each said network interface based upon the load information of the respective network interface.

2. The local network as claimed in claim 1, wherein each said network interface comprises means for exchanging data via radio transmission paths and wherein said distribution means further comprises a radio station, said radio station for exchanging data with said network interfaces via radio transmission paths and further for transmitting the channel distribution for the exchange of data between said network interfaces, wherein the channel distribution comprises a radio channel distribution.

3. The local network as claimed in claim 2, wherein each said network interface further comprises means for transmitting and receiving packets containing data, wherein said transmitting and receiving means includes an output buffer means for buffering the packets to be sent, and means for transmitting load information about the contents of the output buffer means to said radio station.

4. The local network as claimed in claim 3, wherein each said network interface still further comprises means for transmitting and receiving cells formed according to an asynchronous transfer mode (ATM), wherein the cells contain data, and means for transmitting load information about a number of cells to be transmitted to another said network interface.

5. The local network as claimed in claim 4, wherein said radio station further comprises means for assigning time slots of a time-division multiplex frame for each said network interface in response to the number of cells in an assigned output buffer means to be transmitted to another said network interface.

6. The local network as claimed in claim 5, wherein each said network interface still further comprises a controller for controlling the output buffer means and for determining the number of cells in the output buffer means, radio transmitter for transmitting load information available at the controller to said radio station, and a radio receiver for conveying data received from said radio station to the controller and wherein the controller further comprises means for producing an enable command for the radio transmitter, so that only during an assigned time slot is the radio transmitter used for transmitting cells delivered by the output buffer means.

7. The local network as claimed in claim 6, wherein each said network interface still further comprises a switching device for routing cells received by the radio receiver, cells supplied to an assigned station, or cells supplied to the controller, to the assigned station, to the controller, and/or to the radio transmitter.

8. A local network comprising:

a plurality of network interfaces coupled each to a station, said network interfaces for mutually exchanging data; and a distribution means, wherein said distribution means comprises means for exchanging data with said network interfaces, means for receiving load information of said network interfaces, wherein the load information comprises an amount of information to be transmitted in a data exchange between said network interfaces, and means for transmitting, in response to the load information, a channel distribution for the exchange of data between said network interfaces, wherein each said network interface comprises means for exchanging data via radio transmission paths and wherein said distribution means further comprises a radio station, said radio station for exchanging data with said network interfaces via radio transmission paths and further for transmitting the channel distribution for the exchange of data between said network interfaces, wherein the channel distribution comprises a radio channel distribution, wherein each said network interface further comprises means for transmitting and receiving packets containing data, wherein said transmitting and receiving means includes an output buffer means for buffering the packets to be sent, and means for transmitting load information about the contents of the output buffer means to said radio station, wherein each said network interface still further comprises means for transmitting and receiving cells formed according to an asynchronous transfer mode (ATM), wherein the cells contain data, and means for transmitting load information about a number of cells to be transmitted to another said network interface, wherein said radio station further comprises means for assigning time slots of a time-division multiplex frame for each said network interface in response to the number of cells in an assigned output buffer means to be transmitted to another said network interface, wherein each said network interface still further comprises a controller for controlling the output buffer means and for determining the number of cells in the output buffer means, a radio transmitter for transmitting load information available at the controller to said radio station, and a radio receiver for conveying data received from said radio station to the controller and wherein the controller further comprises means for producing an enable command for the radio transmitter, so that only during an assigned time slot is the radio transmitter used for transmitting cells delivered by the output buffer means, wherein each said network interface still further comprises a switching device for routing cells received by the radio receiver, cells supplied to an assigned station, or cells supplied to the controller, to the assigned station, to the controller, and/or to the radio transmitter, wherein the switching device is coupled via auxiliary lines to an output of the station, an output of the controller, and an output of the radio receiver, respectively, and via trunk lines to an input of the station, an input of the controller, and an input of the radio transmitter, respectively, wherein each trunk line is coupled to a transmission buffer, wherein each transmission buffer is coupled via a respective cell filter to an auxiliary line, wherein each cell filter comprises means for verifying an address of a cell and for conveying cells carrying a correct address to an assigned transmission buffer, and further wherein the switching device further comprises a switch controller, said switch controller for exchanging messages about the cells conveyed to a transmission buffer with a respective cell filter and for enabling the corresponding transmission buffer.

9. A local network comprising:

a plurality of network interfaces coupled each to a station, said network interfaces for mutually exchanging data; and a distribution means, wherein said distribution means comprises means for exchanging data with said network interfaces, means for receiving load information of said network interfaces, wherein the load information comprises an amount of information to be transmitted in a data exchange between said network interfaces, and means for transmitting, in response to the load information, a channel distribution for the exchange of data between said network interfaces, wherein each said network interface comprises means for exchanging data via radio transmission paths and wherein said distribution means further comprises a radio station, said radio station for exchanging data with said network interfaces via radio transmission paths and further for transmitting the channel distribution for the exchange of data between said network interfaces, wherein the channel distribution comprises a radio channel distribution, wherein each said network interface further comprises means for transmitting and receiving packets containing data, wherein said transmitting and receiving means includes an output buffer means for buffering the packets to be sent, and means for transmitting load information about the contents of the output buffer means to said radio station, wherein each said network interface still further comprises means for transmitting and receiving cells formed according to an asynchronous transfer mode (ATM), wherein the cells contain data, and means for transmitting load information about a number of cells to be transmitted to another said network interface, wherein said radio station further comprises means for assigning time slots of a time-division multiplex frame for each said network interface in response to the number of cells in an assigned output buffer means to be transmitted to another said network interface, wherein said radio station comprises a base controller, the base controller being operable during each time-division multiplex frame, wherein the base controller comprises means for receiving a number $Z_k$ of cells buffered in an output buffer means of one said network interface, wherein the number $Z_k$ of cells is intended to be transferred to another said network interface, means for computing a number $S_k$ of time slots of a time-division multiplex frame for said network interface utilizing the formula:

$$S_k = INT(A_k\, M)$$

$$A_k = \begin{cases} \dfrac{Z_k}{\sum_{i=1}^{n} Z_i} & \text{if } k = 1 \\[2ex] \left(1 - \sum_{i=1}^{k-1} B_i\right) \dfrac{Z_k}{\sum_{i=k}^{n} Z_i} & \text{otherwise} \end{cases}$$

$$B_i = \dfrac{S_i}{M},$$

where INT is a rounding operation, M is the number of time slots of a time-division multiplex frame, n is the number of said network interfaces, k=1, 2, ..., n and i=1, 2, ..., n−1, and means for distributing the time slots for each said network interface.

10. The local network as claimed in claim 2, wherein said radio station further comprises a bridging element for conveying data received from one said network interface to another said network interface.

11. A network interface for a local network, said interface being coupled to a station, said interface comprising:

means for exchanging data with adjacent network interfaces and a distribution means, and means for transmitting load information to the distribution means, wherein the load information comprises an amount of information to be transmitted in a data exchange between network interfaces, and said network interface further comprising means for receiving information about at least one radio channel to be used for the data exchange with the network interfaces adjacent to the distribution means, wherein the information about the at least one radio channel comprises a channel allocation and a channel capacity derived from a channel distribution provided by the distribution means, the channel distribution being determined from load information from all network interfaces of the local network, wherein the channel distribution comprises a channel allocation and a channel capacity for each respective network interface based upon the load information of the respective network interface.

12. A radio station for a local network comprising a plurality of network interfaces coupled each to a station (7), which interfaces are provided for exchanging data via radio transmission paths, said radio station comprising:

means for exchanging data with the network interfaces via radio transmission paths, means for receiving load information of the network interfaces, wherein the load information comprises an amount of information to be transmitted in a data exchange between the network interfaces, and means for transmitting, in response to the load information, a radio channel distribution for the data exchange between the network interfaces, wherein the channel distribution is determined from the received load information of all said network interfaces and further comprises a channel allocation and a channel capacity for each said network interface based upon the load information of the respective network interface.

13. The local network as claimed in claim 8, wherein said radio station further comprises a bridging element for conveying data received from one said network interface to another said network interface.

14. The local network as claimed in claim 9, wherein said radio station further comprises a bridging element for conveying data received from one said network interface to another said network interface.

* * * * *